United States Patent
Takeuchi et al.

(10) Patent No.: US 7,436,796 B2
(45) Date of Patent: Oct. 14, 2008

(54) MOBILE-UNIT-DEDICATED DATA DELIVERY ASSISTANCE METHOD

(75) Inventors: Tadashi Takeuchi, Yokohama (JP); Yasuhiro Takahashi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 436 days.

(21) Appl. No.: 11/038,496

(22) Filed: Jan. 21, 2005

(65) Prior Publication Data

US 2006/0120326 A1   Jun. 8, 2006

(30) Foreign Application Priority Data

Dec. 7, 2004   (JP) .............................. 2004-353500

(51) Int. Cl.
*H04Q 7/00*   (2006.01)
(52) U.S. Cl. ...................... 370/328; 370/331; 455/436; 455/437
(58) Field of Classification Search ................. 455/436, 455/437–444; 370/331; 709/217–219, 238
See application file for complete search history.

(56) References Cited

U.S. PATENT DOCUMENTS

| | | | | |
|---|---|---|---|---|
| 5,530,693 A | * | 6/1996 | Averbuch et al. ............ | 370/331 |
| 6,324,207 B1 | * | 11/2001 | Kanterakis et al. .......... | 375/141 |
| 6,985,463 B1 | * | 1/2006 | Wright et al. ................ | 370/331 |
| 2002/0094813 A1 | | 7/2002 | Koshimizu et al. | |
| 2003/0114158 A1 | * | 6/2003 | Soderbacka et al. ......... | 455/436 |
| 2006/0034313 A1 | * | 2/2006 | Aaltonen ..................... | 370/432 |
| 2006/0291455 A1 | * | 12/2006 | Katz et al. ................... | 370/355 |

* cited by examiner

*Primary Examiner*—Vincent P. Harper
*Assistant Examiner*—Simon A Goetze
(74) *Attorney, Agent, or Firm*—McDermott Will & Emery LLP

(57) ABSTRACT

Contents delivery to a mobile node which changes its existence position is executed from a delivery node with a high quality. Each cache server is located between each wireless LAN in which the mobile node can exists and a wired network. Each cache server delivers contents from the delivery node to the mobile node while storing the contents into a buffer. When the mobile node has moved, the mobile node transmits a moving notice to a cache server which is connected to a wireless LAN of the moving destination. Having received the moving notice, the cache server acquires the content in the buffer from a cache server which the mobile node had utilized before the moving. This configuration allows retransmission of the contents to the mobile node, thereby resulting in an enhancement in the delivery quality.

8 Claims, 8 Drawing Sheets

FIG.3

| 106 DELIVERY REQUEST | TRANSMISSION-SOURCE IP ADDRESS | TRANSMISSION-DESTINATION IP ADDRESS | DELIVERY-SERVER IP ADDRESS | URL | DELIVERY START OFFSET | |
|---|---|---|---|---|---|---|
| 107 MOVING NOTICE | TRANSMISSION-SOURCE IP ADDRESS | TRANSMISSION-DESTINATION IP ADDRESS | OLD CACHE-SERVER IP ADDRESS | OLD MOBILE-NODE IP ADDRESS | DELIVERY-SERVER IP ADDRESS | URL |
| 108 MOVING REQUEST | TRANSMISSION-SOURCE IP ADDRESS | TRANSMISSION-DESTINATION IP ADDRESS | OLD MOBILE-NODE IP ADDRESS | DELIVERY-SERVER IP ADDRESS | URL | |
| BUFFER-AREA LIBERATION REQUEST | TRANSMISSION-SOURCE IP ADDRESS | TRANSMISSION-DESTINATION IP ADDRESS | OLD MOBILE-NODE IP ADDRESS | DELIVERY-SERVER IP ADDRESS | URL | |
| RECEPTION ACKNOWL-EDGEMENT NOTICE | TRANSMISSION-SOURCE IP ADDRESS | TRANSMISSION-DESTINATION IP ADDRESS | DELIVERY-SERVER IP ADDRESS | URL | RECEPTION-ACKNOWL-EDGEMENT-OVER OFFSET | |
| RETRANSMI-SSION REQUEST | TRANSMISSION-SOURCE IP ADDRESS | TRANSMISSION-DESTINATION IP ADDRESS | DELIVERY-SERVER IP ADDRESS | URL | RETRANSMI-SSION START OFFSET | |

FIG.4

MOBILE - NODE MANAGEMENT TABLE — 401

| MOBILE-NODE IP ADDRESS | OLD CACHE-SERVER IP ADDRESS | DELIVERY-SERVER IP ADDRESS | URL | RECEPTION-ACKNOWLED-GEMENT-OVER OFFSET | TRANS-MISSION-OVER OFFSET | NEXT-TIME TRANS-MISSION POINT-IN-TIME | OPERATION MODES |
|---|---|---|---|---|---|---|---|
| | | | | | | | NORMAL |
| | | | | | | | MOVING |
| | | | | | | | CACHE |
| | | | | | | | ... |
| | | | | | | | ... |
| | | | | | | | ... |

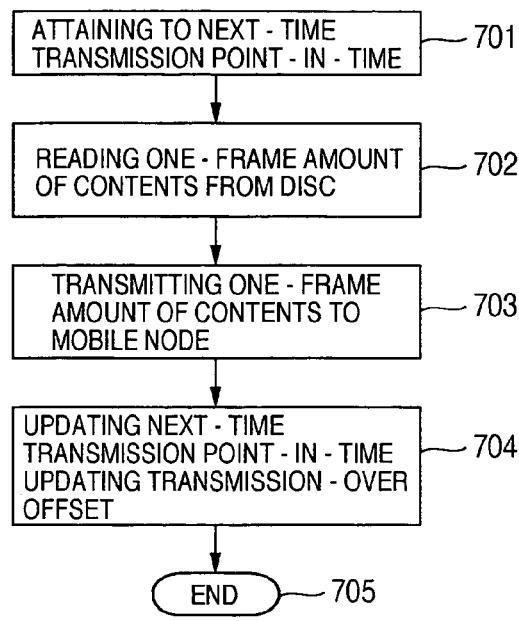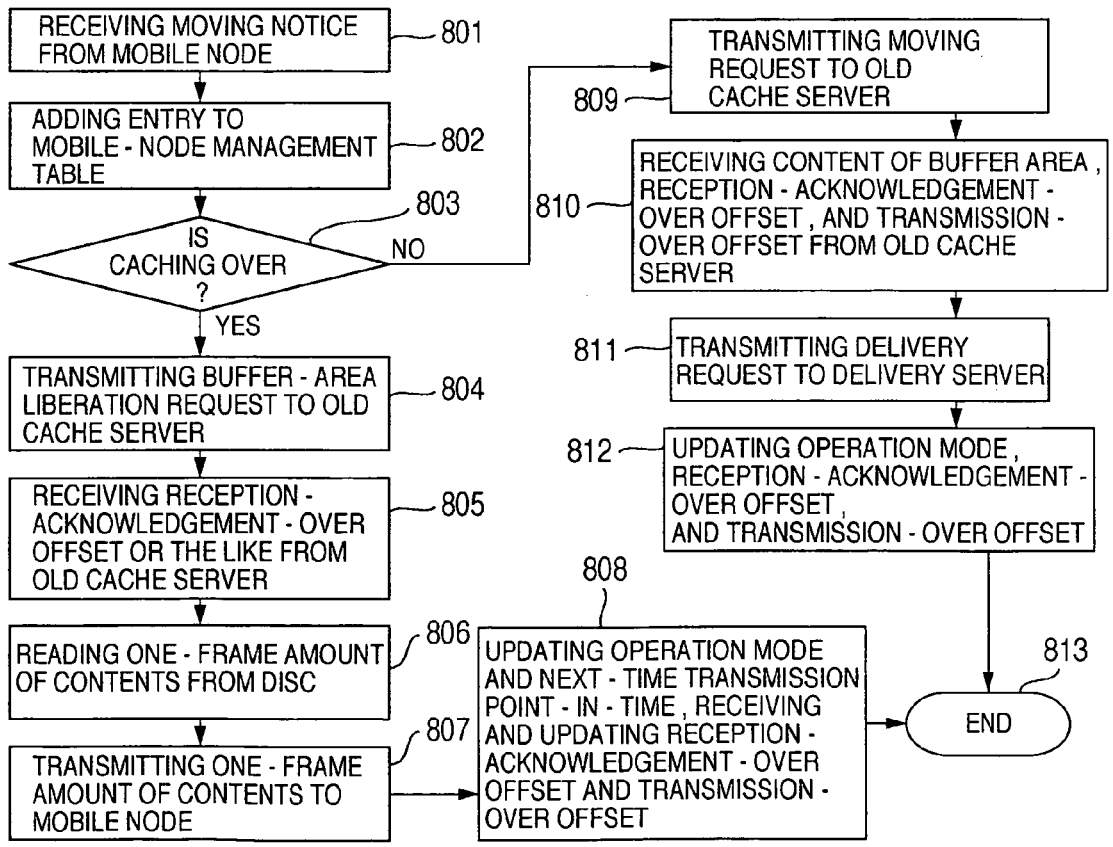

RECEPTION - CONTENTS MANAGEMENT TABLE — 1301

| DELIVERY - SERVER IP ADDRESS | URL | CACHE - SERVER IP ADDRESS | RECEPTION - OVER OFFSET |
|---|---|---|---|
|  |  |  |  |
|  |  |  |  |

- CHECKING WIRELESS - LAN MOVING — 1401
- TRANSMITTING MOVING NOTICE TO NEW CACHE SERVER — 1402
- UPDATING CACHE - SERVER IP ADDRESS — 1403
- END — 1404

US 7,436,796 B2

MOBILE-UNIT-DEDICATED DATA DELIVERY ASSISTANCE METHOD

INCORPORATION BY REFERENCE

This application claims priority based on a Japanese patent application, No. 2004-353500 filed on Dec. 7, 2004, the entire contents of which are incorporated herein by reference.

BACKGROUND OF THE INVENTION

The present invention relates to a method for assisting a mobile-unit-dedicated data delivery processing. In particular, it relates to a technology for assisting an enhancement in delivery quality of contents data when the contents data is delivered from a node existing on a wired network to a node existing on a wireless network.

As a communications method for assisting an enhancement (i.e., prevention of data missing) in delivery quality of such data as contents when such data as contents is delivered from a delivery node existing on a wired network to a mobile node existing on a wireless network, there has been known a method disclosed in a published US patent application US2002/0094813A1.

In the method disclosed in this document, plural cache servers are located between the delivery node and the mobile node. Moreover, if one of the cache servers (first cache server) existing on a route between the delivery server and the mobile node holds information that the mobile node requests, this information is delivered not from the delivery server but from the first cache server.

Furthermore, if the mobile node changes its physical existence position and thus the route between the delivery server and the mobile node has changed, the following operation will be performed: First, it is checked whether or not one of cache servers (second cache server) existing on a new route holds the information. If the second cache server holds the information, the second cache server acquires information on the already delivered information from the first cache server. In addition, the second cache server delivers the remaining information to the mobile node.

In this way, as the mobile node changes its physical existence position, another cache server delivers the remaining information portion to the mobile node. This allows proposal of efficient information delivery.

SUMMARY OF THE INVENTION

The above-described technology allows implementation of the enhancement in the information delivery quality unless retransmission requests frequently attain to the cache servers from the mobile node. Here, the retransmission requests are made in the case or the like where the information received by the mobile node contains an error. If, however, the retransmission requests for the information have frequently attained thereto, because of the following reason, there exists a possibility that the information delivery quality will become insufficient:

First, even if there exists a third cache server which is closer to the mobile node in a network terms as compared with the first cache server and the second cache server, the third cache server will perform no information delivery to the mobile node unless the third cache server holds the information requested by the mobile node. On account of this, there exists a possibility that a time will become longer which is needed from a point-in-time when the mobile node had issued an information retransmission request to the first cache server or the second cache server until a point-in-time when retransmission information delivered by the first cache server or the second cache server has attained to the mobile node. If this time becomes longer, in the case where the information to be delivered is contents which are required to have real-time property, the retransmission contents data will not attain to the mobile node by a point-in-time when the retransmission contents data should be reproduced. This results in a degradation in the contents delivery quality.

Second, even if the cache server which is to perform the information delivery is alternated from the first cache server to the second cache server because of the situation where the mobile node has changed its physical position, the second cache server has not received, from the first cache server, information (i.e., information on data offset or the like stored in the last reception acknowledgement notice received from the mobile node) for making preparations for the retransmission. On account of this, even if the second cache server receives, from the mobile node, a reception acknowledgement notice including new data offset, the second cache server cannot make a judgment as to whether or not a data missing exists in the information data that the mobile node has received. As a result, there exists a possibility that, if the data missing actually occurs in the information data that the mobile unit has received, the mobile node cannot receive the retransmission information data. This results in degradation in the information delivery quality.

The present invention provide a method for assisting a mobile-unit-dedicated data delivery processing which allows the delivery quality to be maintained at a sufficiently high level even under a situation where a mobile node changes its existence position physically and where a data missing within the network occurs with much frequency.

The present invention provides the data-delivery processing assistance method using data-delivery assistance devices.

A data-delivery assistance device according to the present invention receives a delivery request from a mobile node, then judging whether or not the assistance device holds contents data specified by the delivery request. If the assistance device holds the contents data, the device delivers the contents data to the mobile node. Even if the assistance device holds none of the contents data, the device transmits the delivery request to a delivery server, thereby receiving the contents from the delivery server. Then, the data-delivery assistance device delivers the received contents to the mobile node and simultaneously, holds the received contents within the assistance device itself.

Moreover, the data-delivery assistance device according to the present invention receives a reception acknowledgement notice from the mobile node. In addition, the assistance device determines a mobile node-dedicated buffer area (i.e., contents data area for making preparations for retransmission-request attainment) from offset information included in the reception acknowledgement notice and offset information already delivered from the assistance device itself.

Furthermore, the data-delivery assistance device according to the present invention receives a retransmission request from the mobile node. In addition, in response to the retransmission request, the assistance device delivers retransmission contents data from the above-described buffer area. The data-delivery assistance devices are located in large number at points which are at close distances from the mobile node in a network terms. This allows the present retransmission processing to be completed in a short time. As a result, it becomes possible to maintain the contents delivery quality at a sufficiently high level.

Also, the data-delivery assistance device according to the present invention receives a moving notice from the mobile node. This moving notice is a notice for the mobile node to request that the mobile node wishes to newly utilize the assistance device as a cache server. The moving notice also includes therein information on another data-delivery assistance device which the mobile node had utilized as the cache server before.

After having received the moving notice, the data-delivery assistance device receives, from another data-delivery assistance device, information for responding to the retransmission request for the contents or the like stored into the buffer area, thereby making preparations for the retransmission-request attainment from the mobile node. Even if another data-delivery assistance device, which the mobile node has utilized in accompaniment with the moving, becomes distant in a network terms, this information transfer makes it possible to perform the contents retransmission processing from the data-delivery assistance device which is closer and newer. As a result, it becomes possible to maintain the contents delivery quality at a sufficiently high level.

Incidentally, the present invention is applicable not only to stream-delivered contents, but also to accumulation-type contents.

The present invention makes it possible to provide the mobile-unit-dedicated data delivery technology which allows the contents delivery quality to be maintained at a sufficiently high level.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 is a diagram for exemplifying formats of the respective types of requests transmitted/received among the delivery server, the cache servers, and the mobile node;

FIG. 4 is a diagram for exemplifying the data structure of the mobile-node management table that the cache server holds;

FIG. 7 is a flowchart for exemplifying the operation at the time when the cache server has attained to a point-in-time at which the cache server should deliver the contents;

FIG. 8 is a flowchart for exemplifying the operation at the time when the cache server receives the moving notice;

DETAILED DESCRIPTION OF THE EMBODIMENTS

Referring to FIG. 1 to FIG. 15, the explanation will be given below concerning embodiments of the present invention.

Figure 1:
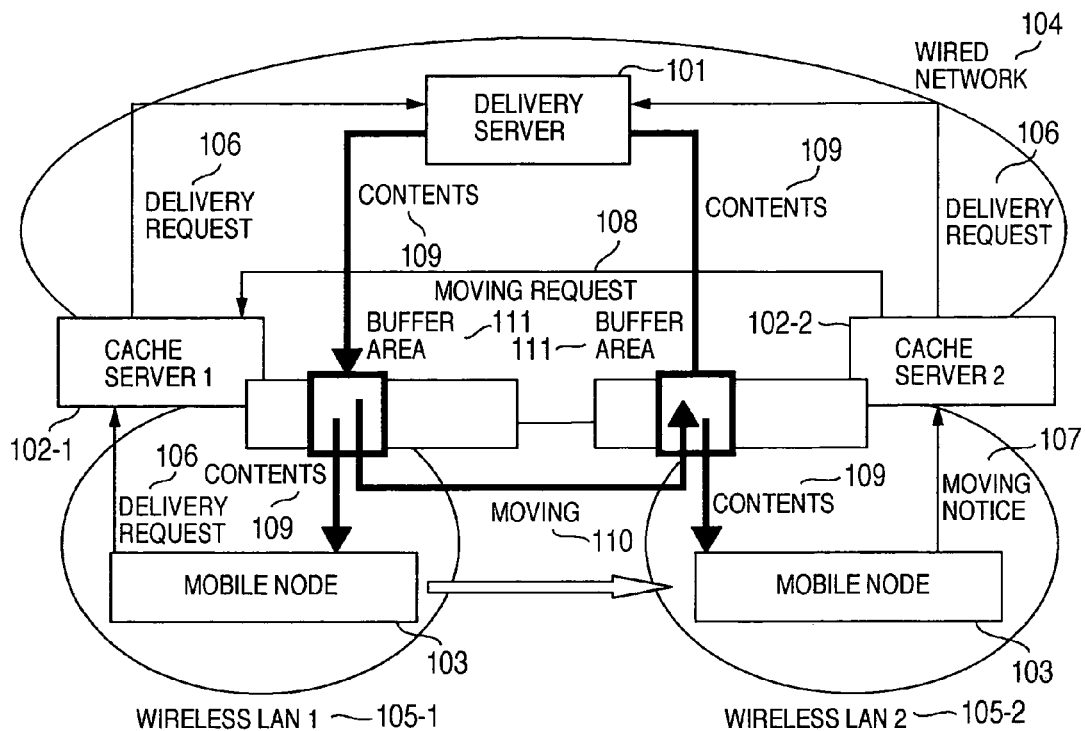
FIG. 1 is a diagram for exemplifying system configuration of an embodiment of the present invention.

FIG. 1 is a diagram for illustrating system configuration of an embodiment of the present invention.

In the present system, a delivery server device (hereinafter, referred to as "a delivery server") (101) delivers, to a mobile node device (hereinafter, referred to as "a mobile node") (103), contents (109) which the delivery server (101) holds. The delivery server (101) is connected to a wired network (104), and the mobile node (103) is connected to wireless networks (e.g., wireless LANs) (105). Moreover, the wired network (104) and the wireless LANs (105) are connected to each other via access-point devices. Also, it is assumed that the wired network (104) and the wireless LANs (105) are IP networks using IP addresses.

In the present embodiment, in order to enhance delivery quality of the contents from the delivery server (101), data-delivery assistance devices (hereinafter, referred to as "cache servers") (102), each of which includes a buffer area (111) for temporarily storing (i.e., caching) the contents (109), are connected to the above-described access-point devices.

In FIG. 1, the access-point devices are not illustrated. It is assumed that the cache servers (102) also play a role of the access-point devices and further, the cache servers (102) utilize the same IP addresses as those of the access-point devices.

After establishing a connection with an access-point device, the mobile node (103) transmits a delivery request (106) to address of the delivery server (101). The delivery request (106) is transmitted to the cache server (102) via the access-point device. Having received the delivery request (106), the cache server (102) checks whether or not the cache node itself holds the contents (109) included in the delivery request (106).

If the cache server (102) holds the requested contents (109), the cache server delivers the contents to the mobile node (103). If the cache node itself holds none of the contents, the cache server (102) transmits the delivery request (106) to the delivery server (101), thereby receiving the contents (109) from the delivery server (101). Then, the cache server delivers the received contents (109) to the mobile node (103) and simultaneously, holds the received contents (109) within the cache node itself.

Each cache server (102) receives a contents-corresponding reception acknowledgement notice transmitted from the mobile node (103). Moreover, for each of plural mobile nodes (103), each cache server (102) manages which portion of the contents should be held in the buffer area (111) of each cache node itself. Furthermore, if a retransmission request has attained thereto from the mobile node (103), each cache server retransmits the necessary portion of the contents (109) from the buffer area (111).

If the mobile node (103) changes its physical existence position and thus the access point to which the mobile node (103) has been connected changes, the mobile node (103) establishes a connection with a new access point (105-2), then transmitting a moving notice (107). The moving notice (107) is transmitted to a new cache server (102-2) which is connected to the new access point (105-2).

After receiving the moving notice (107), the cache server (102-2) transmits a moving request (108) to the cache server (102-1) which the mobile node (103) had utilized before.

In response to the moving request (108), the old cache server (102-1) transmits, to the new cache server (102-2), information for allowing the new cache server (102-2) to process a retransmission which the mobile node (103) has a possibility of requesting. Then, in order to delete the content of the corresponding buffer area (111), the old cache server (102-1) liberates the buffer area (111) (110). Incidentally, in the transmission of the buffer area (111)'s content, even in the case of, e.g., stream contents, higher-speed transmission is performed without employing a contents-originated transmission timing. This makes it possible to swiftly respond to the retransmission request.

Furthermore, the new cache server (102-2) transmits, to the delivery server (101), a delivery request (106) for requesting non-cached frame or the whole of the contents, thereby starting to receive the contents (109). In addition, the cache server (102-2) makes preparations for attainment of a new retransmission request from the mobile node (103).

If the new cache server (102-2) has already held the contents, the cache server (102-2) performs none of the above-described moving-request transmission. Instead, the cache server (102-2) instructs liberation of the buffer area (111) of the cache server (102-1) which the mobile node (103) had utilized before. Then, as the response thereto, the cache server (102-2) receives information needed for processing the above-described retransmission request.

Figure 2:
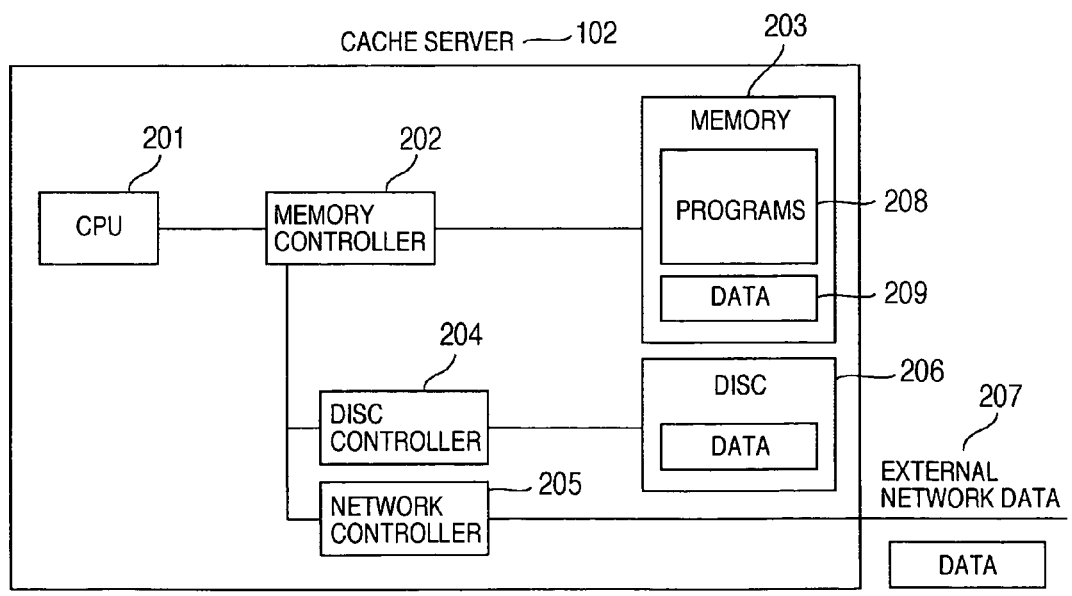
FIG. 2 is a diagram for exemplifying hardware configuration of the cache server.

FIG. 2 is a diagram for illustrating hardware configuration of the cache server (102). A CPU (201) and a memory (203) are connected to the cache server (102) via a memory controller (202). Programs for implementing operation as the cache server are stored in the memory (203), or in a secondary storage device (hereinafter, referred to as "a disc") (206) such as a hard disc. The CPU (201) executes the programs while reading the programs from the memory (203). Also, the CPU (201) is connected via a disc controller (204) to the disc (206) which is also used as the buffer area (111). A program for controlling the disc controller (204) allows data (209) existing on the memory (203) to be transferred to the disc (206), and also allows data existing on the disc (206) to be transferred to the memory (203).

Also, the cache server (102) includes a network controller (205), which is connected via an external network (207) to the delivery server (101) and the access-point devices of the wireless LANs. The cache server (102) executes a program for controlling the network controller (205). This execution allows the data existing on the memory (203) to be transferred to the external network (207), and also allows data received via the external network (207) to be transferred to the memory (203).

The above-described programs may be stored into the memory (203) or the disc (206) in advance. Otherwise, the programs may be introduced into the memory (203) or the disc (206) when required via a removable storage medium or a communications medium (e.g., wired or wireless network, or carrier wave or digital signal on the network) which is made available to the cache server (102).

The use of the above-described configuration permits the cache server (102) to transmit/receive the contents (109) and the respective types of requests such as the delivery request (106) via the external network (207), and to store (i.e., to cache) the contents (109) into the disc (206).

Also, although not illustrated, the delivery server (101) and the mobile node (103) also have basically the same configuration as the one of the cache servers (102). Accordingly, the CPU (201) executes the programs stored in the memory (203), thereby implementing operation which will be explained in the following embodiment:

FIG. 3 is a diagram for illustrating formats of the respective types of requests transmitted/received among the delivery server (101), the cache servers (102), and the mobile node (103). As described earlier, the above-described requests are as follows: The delivery request (106), the moving notice (107), the moving request (108), the buffer-area liberation request, the reception acknowledgement notice, and the retransmission request.

The delivery request (106) includes the following information: Transmission-source IP address (IP address of node which had transmitted the delivery request), transmission-destination IP address (IP address of node which should receive the delivery request), delivery-server IP address (IP address of the delivery server (101) which holds requested contents), URL (information for uniquely identifying the requested contents), and delivery start offset (offset for indicating a position of the delivery target contents at which the delivery should be started).

The moving notice (107) includes the following information: Transmission-source IP address (IP address of node which had transmitted the moving notice), transmission-destination IP address (IP address of node which should receive the moving notice), old cache-server IP address (IP address of cache server which the mobile node had utilized before moving), old mobile-node IP address (IP address which the mobile node had used before moving), delivery-server IP address (IP address of the delivery server (101) which holds the requested contents), and URL (information for uniquely identifying the requested contents).

The moving request (108) and the buffer-area liberation request include the following information: Transmission-source IP address (IP address of node which had transmitted the moving request), transmission-destination IP address (IP address of node which should receive the moving request), old mobile-node IP address (IP address which the mobile node had used before moving), delivery-server IP address (IP address of the delivery server (101) which holds the requested contents), and URL (information for uniquely identifying the requested contents).

The reception acknowledgement notice includes the following information: Transmission-source IP address (IP address of node which had transmitted the acknowledgement notice), transmission-destination IP address (IP address of node which should receive the acknowledgement notice), delivery-server IP address (IP address of the delivery server (101) which holds the requested contents), URL (information for uniquely identifying the requested contents), and reception-acknowledgement-over offset (offset for indicating a portion of the requested contents the reception of which the mobile node has completed).

The retransmission request includes the following information: Transmission-source IP address (IP address of node which had transmitted the retransmission request), transmission-destination IP address (IP address of node which should receive the retransmission request), delivery-server IP address (IP address of the delivery server (101) which holds requested contents), URL (information for uniquely identifying the requested contents), and retransmission start offset (offset for indicating a position of the requested contents at which the retransmission should be started).

Incidentally, although not illustrated, the respective requests or notices include information for indicating respective types thereof.

Referring to FIG. 4 to FIG. 12, the explanation will be given below concerning the operation of the cache server (102).

Taking advantage of a mobile-node management table (401) illustrated in FIG. 4, the cache server (102) manages which of the contents (109) is being delivered to which of the mobile nodes (103) at present. Moreover, the cache server (102) starts the operation with the following receptions as the opportunities: Reception of the delivery request (106), reception of the contents (109), reception of the moving notice (107), reception of the moving request (108), reception of the buffer-area liberation request, reception of the reception acknowledgement notice, and reception of the retransmission request. Then, the cache server (102) executes transmission/reception of the contents or the like while updating the mobile-node management table (401).

Hereinafter, the indication will be given below regarding data structure of the mobile-node management table (401), and operation steps of the programs on the cache server (102) in the above-described respective operation opportunities.

FIG. 4 is a diagram for illustrating the data structure of the mobile-node management table (401). The present table includes fields capable of storing the following respective information: Mobile-node IP address (IP address of the mobile node (103) which is contents delivery destination), old cache-server IP address (IP address of the cache server (102) which has become issuing destination of the moving request), delivery-server IP address (IP address of the delivery server (101) which holds the under-delivery contents (109)), URL (information for uniquely identifying the under-delivery contents (109)), reception-acknowledgement-over offset (offset for indicating a position of the contents at which the reception acknowledgement by the mobile node (103) has been terminated), transmission-over offset (offset for indicating a position of the contents at which the transmission to the mobile node (103) has been terminated), next-time transmission point-in-time (point-in-time when contents transmission should be performed next), and operation modes.

As the operation modes of the cache server (102), there exist three modes, i.e., normal, cache, and moving modes.

The normal mode is the following state: Namely, while receiving the contents (109) from the delivery server (101), the cache server (102) is writing the contents (109) into the buffer area (111) within the disc (206) that the cache server (102) includes. Simultaneously therewith, the cache server (102) is delivering the contents (109) to the mobile node (103).

The cache mode is the following state: Namely, the cache server (102) has already held the contents (109) requested by the mobile node (103) in the buffer area (111) within the disc (206). Moreover, the cache server (102) is transmitting the contents (109) to the mobile node (103) while reading the contents (109) from the buffer area (111).

The moving mode is the following state: Namely, from the old cache server (i.e., the cache server (102-1) which the mobile node (103) had utilized before the moving), the cache server (102) is receiving the data in the buffer area (111).

In the normal mode, no use is made of the fields of the old cache-server IP address and next-time transmission point-in-time in the mobile-node management table (401). In the cache mode, no use is made of the field of the old cache-server IP address therein. Also, in the moving mode, no use is made of the fields of the reception-acknowledgement-over offset, transmission-over offset, and next-time transmission point-in-time therein.

Figure 5:
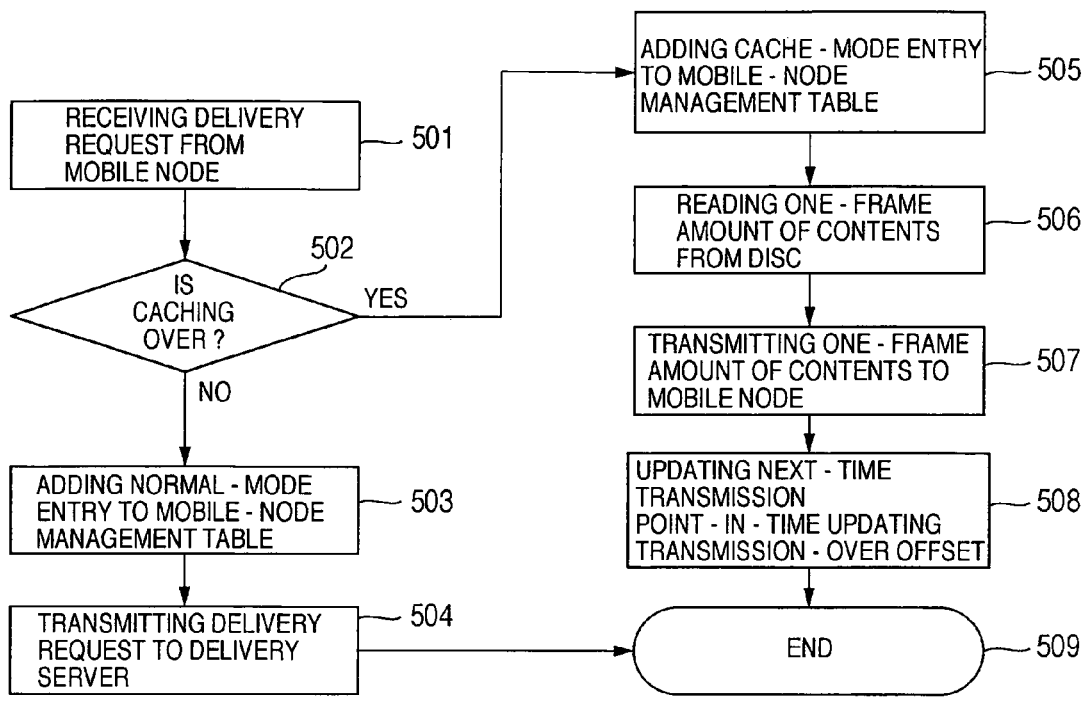
FIG. 5 is a flowchart for exemplifying the operation at the time when the cache server receives the delivery request.

FIG. 5 is a flowchart for illustrating the operation at the time when the cache server (102) receives the delivery request (106) from the mobile node (103). In this flowchart, the explanation will be given assuming that the information to be delivered is stream contents.

At a step 501, the cache server (102) receives the delivery request (106) from the mobile node (103).

At a step 502, the cache server (102) checks whether or not the contents specified by the URL included in the delivery request (106) have been already stored in the disc (206) of the cache server (102). If the contents have been not stored, the cache server proceeds to a step 503. If stored, the cache server jumps to a step 505.

At the step 503, the cache server newly creates a normal-mode entry in the mobile-node management table (401). The mobile-node IP address field of the created entry is initialized to the transmission-source IP address stored in the received delivery request (106). The information stored in the delivery request (106) is copied into the delivery-server IP address field and URL field with no change added thereto. The reception-acknowledgement-over offset field and transmission-over offset field are initialized to the delivery start offset stored in the delivery request (106).

At a step 504, the cache server transfers the delivery request to the delivery server (101). In the transferred delivery request, the transmission-source IP address and transmission-destination IP address are updated to the IP address of the cache server (102) and that of the delivery server (101), respectively. In the fields other than these fields, the content of the delivery request received at the step 501 is used with no change added thereto.

At the step 505 up to which the cache server has jumped from the step 502, the cache server newly creates a cache-mode entry in the mobile-node management table (401). The fields other than the next-time transmission point-in-time field are initialized in basically the same manner as at the step 503. The next-time transmission point-in-time field is initialized to the present point-in-time to be newly acquired.

At a step 506, the cache server reads, from the disc (206), a one-frame amount of the contents requested by the delivery request.

At a step 507, the cache server transmits, to the mobile node (103), the one-frame amount of contents that the cache server has read at the step 506.

At a step 508, the cache server updates the next-time transmission point-in-time field and transmission-over offset field in the mobile-node management table (401). The next-time transmission point-in-time field is updated by a one-frame-amount equivalent time (e.g., 40 milliseconds in the case of 25-frame/second contents). Also, the byte number transmitted at the step 507 is added to the transmission-over offset.

At a step 509, the cache server terminates the processing.

Figure 6:
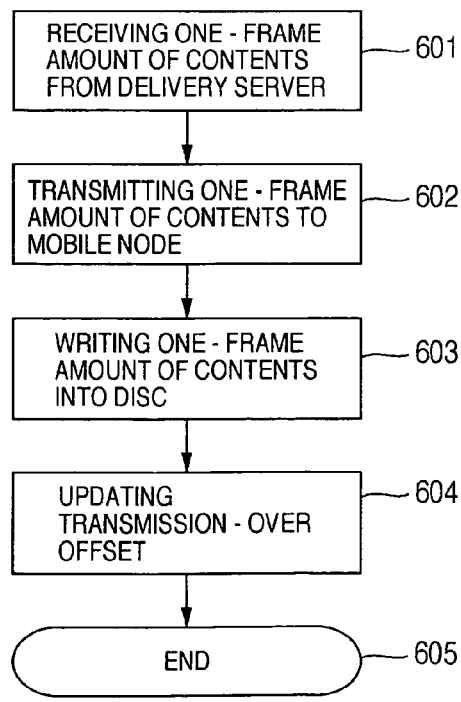
FIG. 6 is a flowchart for exemplifying the operation at the time when the cache server receives the contents from the delivery server.

FIG. 6 is a flowchart for illustrating the operation at the time when the cache server (102) receives the contents from the delivery server (101) as the response to the delivery request that the cache server (102) had transmitted at the step 504 in FIG. 5.

At a step 601, the cache server (102) receives the one-frame amount of contents from the delivery server (101).

At a step 602, the cache server transmits the contents received at the step 601 to the mobile node (103).

At a step 603, the cache server writes the contents received at the step 601 into the disc (206).

At a step 604, the cache server updates the transmission-over offset field of the normal-mode entry which had been newly added at the step 503 in the mobile-node management table (401). In the present updating, the byte number transmitted at the step 602 is added thereto. Incidentally, the steps 602 and 603 may also be processed in parallel, or in the reverse order.

In the flowchart illustrated in FIG. 5, the cache server (102) monitors the next-time transmission point-in-time after having created the cache-mode entry.

When the cache server (102) has attained to a point-in-time at which the cache server should deliver the contents, the cache server (102) performs the following operation, which is illustrated in FIG. 7:

At a step 701, the cache server (102) has attained to a point-in-time at which the cache server should deliver the contents. Then, at a step 702, referring to the transmission-over offset in the mobile-node management table (401), the cache server reads, from the disc (206), a one-frame amount of the contents specified by the URL field of the cache-mode entry which had been newly added at the step 505.

At a step 703, the cache server transmits, to the mobile node (103), the one-frame amount of contents that the cache server has read at the step 702.

At a step 704, the cache server updates the next-time transmission point-in-time field and transmission-over offset field in the mobile-node management table (401). The next-time transmission point-in-time field is updated by a one-frame-amount equivalent time. Also, the byte number transmitted at the step 702 is added to the transmission-over offset.

In addition, the cache server terminates the processing, then continuing stand-by processing.

FIG. 8 is a flowchart for illustrating the operation at the time when the cache server (102) receives the moving notice (107) from the mobile node (103).

At a step 801, the cache server (102) receives the moving notice (107) from the mobile node (103).

At a step 802, the cache server creates a new entry of the moving mode in the mobile-node management table (401). The value of the transmission-source IP address in the moving notice (107) received at the step 801 is stored into the mobile-node IP address field of the created entry. The information included in the received moving notice (107) is duplicated and set into the old cache-server IP address field, delivery-server IP address field, and URL field.

At a step 803, the cache server (102) checks whether or not the contents specified by the URL included in the moving notice (107) have been already stored in the disc (206). If the contents have been already stored therein, the cache server proceeds to a step 804. Otherwise, the cache server jumps to a step 809.

At the step 804, the cache server (102) transmits the buffer-area liberation request to the old cache server (102-1). The IP address of the cache node itself and the IP address of the old cache server are set into the transmission-source IP address included in the buffer-area liberation request and the transmission-destination IP address included therein, respectively. Moreover, the information included in the moving notice (107) is duplicated and set into the old mobile-node IP address, delivery-server IP address, and URL.

This buffer-area liberation request corresponds to the request needed for processing the above-described retransmission request. As the response thereto, at a step 805, the cache server receives the reception-acknowledgement-over offset information and transmission-over offset information from the old cache server (102).

At a step 806, the cache server reads, from the disc (206), a one-frame amount of the contents specified by the URL included in the moving notice (107).

At a step 807, the cache server transmits, to the mobile node (103), the one-frame amount of contents that the cache server has read at the step 806.

At a step 808, the cache server updates, from "moving" to "cache", the operation-mode field of the entry which had been newly created at the step 802. Furthermore, the cache server updates the next-time transmission point-in-time to a value resulting from adding a one-frame-amount equivalent time to the present point-in-time. Also, the cache server updates the reception-acknowledgement-over offset information and transmission-over offset information to the values received at the step 805. In addition, the cache server terminates the processing.

At the step 809 to which the cache server has jumped from the step 803, as the request needed for processing the retransmission request, the cache server transmits the moving request (108) to the old cache server (102-1). The IP address of the cache node itself and the IP address of the old cache server are set into the transmission-source IP address included in the moving request (108) and the transmission-destination IP address included therein, respectively. Moreover, the information included in the moving notice (107) is duplicated and set into the old mobile-node IP address, delivery-server IP address, and URL.

At a step 810, the cache server receives, from the old cache server, content of the buffer area including at least a contents portion that the mobile node has not received yet, the reception-acknowledgement-over offset information, and the transmission-over offset information.

At a step 811, the cache server transmits the delivery request (106) to the delivery server (101). The IP address of the cache node itself and the IP address of the delivery server (101) are set into the transmission-source IP address included in the delivery request (106) and the transmission-destination IP address included therein, respectively. The information included in the moving notice (107) received at the step 801 is copied into the delivery-server IP address and URL. The value of the transmission-over offset received at the step 810 is set into the delivery start offset.

At a step 812, the cache server updates, from "moving" to "normal", the operation mode of the entry which had been created at the step 802 in the mobile-node management table (401). Furthermore, the cache server updates the reception-acknowledgement-over offset and transmission-over offset to the values received at the step 810. In addition, the cache server terminates the processing.

Figure 9:
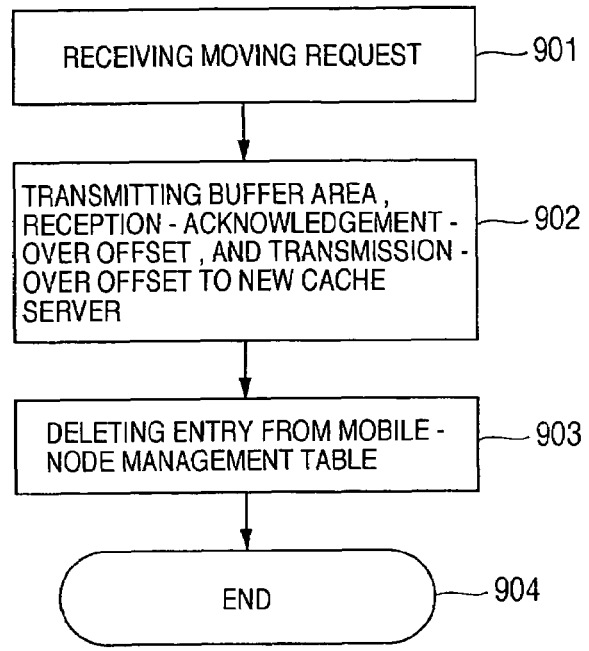
FIG. 9 is a flowchart for exemplifying the operation at the time when the cache server receives the moving request.

FIG. 9 is a flowchart for illustrating the operation at the time when the old cache server (102-1) receives the moving request (108).

At a step 901, the old cache server (102-1) receives the moving request (108) from the new cache server (102-2).

At a step 902, the old cache server determines a correspondence entry in the mobile-node management table (401). The present determination is performed by searching for an entry which has the mobile-node IP address field whose value is the same as the old mobile-node IP address included in the moving request (108). Moreover, the old cache server transmits, to the new cache server (102-2), contents data of the buffer area determined from the reception-acknowledgement-over offset and transmission-over offset in the above-described entry. The old cache server also transmits the reception-acknowledgement-over offset information and transmission-over offset information along therewith.

At a step 903, the old cache server deletes, from the mobile-node management table (401), the above-described correspondence entry judged at the step 902. In addition, the old cache server terminates the processing.

Figure 10:
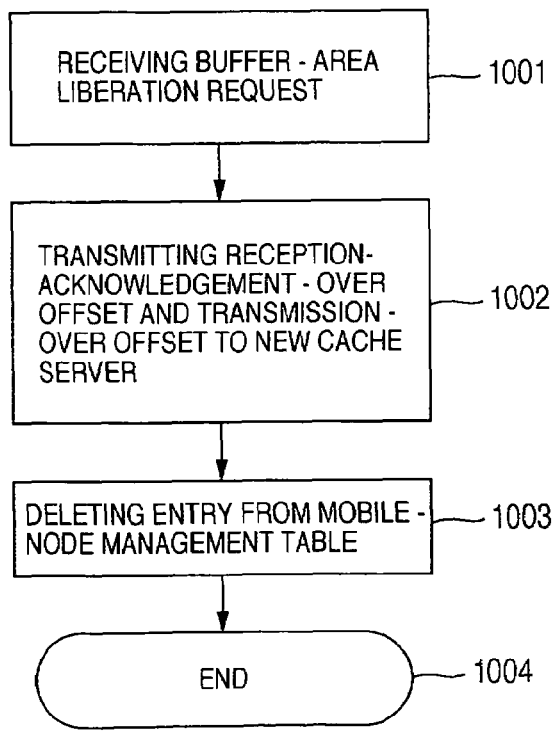
FIG. 10 is a flowchart for exemplifying the operation at the time when the cache server receives the buffer-area liberation request.

FIG. 10 is a flowchart for illustrating the operation at the time when the old cache server (102-1) receives the buffer-area liberation request.

At a step 1001, the old cache server (102-1) receives the buffer-area liberation request from the new cache server (102-2).

At a step 1002, the old cache server determines a correspondence entry in the mobile-node management table (401). The present determination is performed by searching for an entry which has the mobile-node IP address field whose value is the same as the old mobile-node IP address included in the buffer-area liberation request. Moreover, the old cache server transmits the reception-acknowledgement-over offset information and transmission-over offset information in the above-described entry to the new cache server (102-2).

At a step 1003, the old cache server deletes, from the mobile-node management table (401), the above-described correspondence entry judged at the step 1002. In addition, the old cache server terminates the processing.

Figure 11:
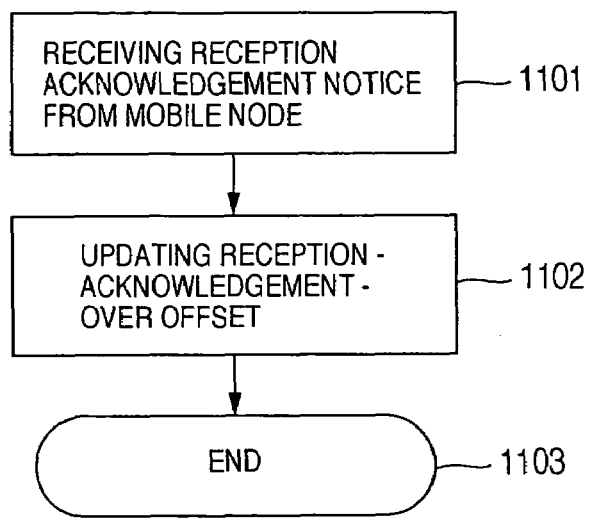
FIG. 11 is a flowchart for exemplifying the operation at the time when the cache server receives the reception acknowledgement notice.

FIG. 11 is a flowchart for illustrating the operation at the time when the cache server (102) receives the reception acknowledgement notice.

At a step 1101, the cache server receives the reception acknowledgement notice from the mobile node (103).

At a step 1102, the cache server determines a correspondence entry in the mobile-node management table (401). The present determination is performed by searching for an entry which has the mobile-node IP address field whose value is the same as the transmission-source IP address included in the reception acknowledgement notice. Moreover, the cache server updates value of the reception-acknowledgement-over offset in the entry to value of the reception-acknowledgement-over offset included in the reception acknowledgement notice. In addition, the cache server terminates the processing.

Figure 12:
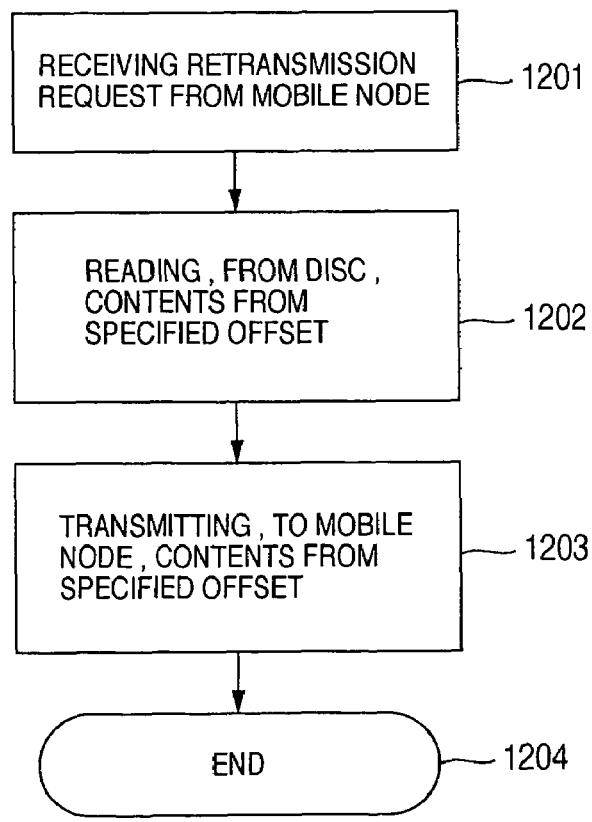
FIG. 12 is a flowchart for exemplifying the operation at the time when the cache server receives the retransmission request.

FIG. 12 is a flowchart for illustrating the operation at the time when the cache server (102) receives the retransmission request.

At a step 1201, the cache server receives the retransmission request from the mobile node (103).

At a step 1202, the cache server reads, from the disc (206), contents specified by the URL stored in the retransmission request. In the present reading, a one-frame amount of the data is read from the retransmission start offset included in the retransmission request.

At a step 1203, the cache server transmits, to the mobile node (103), the one-frame amount of contents that the cache server has read at the step 1202. In addition, the cache server terminates the processing.

Figures 13, 14:
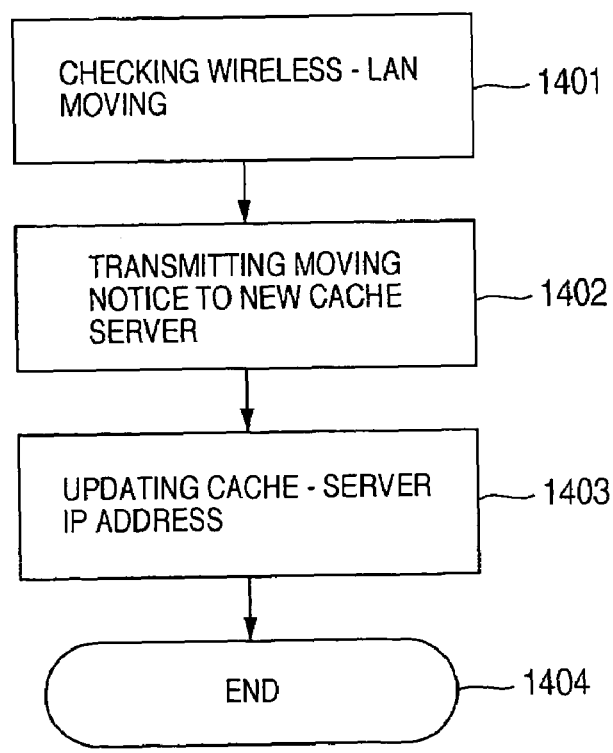
FIG. 13 is a diagram for exemplifying the data structure of the reception-contents management table that the mobile node holds.
FIG. 14 is a flowchart for exemplifying the operation at the time when the mobile node detects that the mobile node has moved from the wireless LAN.
Figure 15:
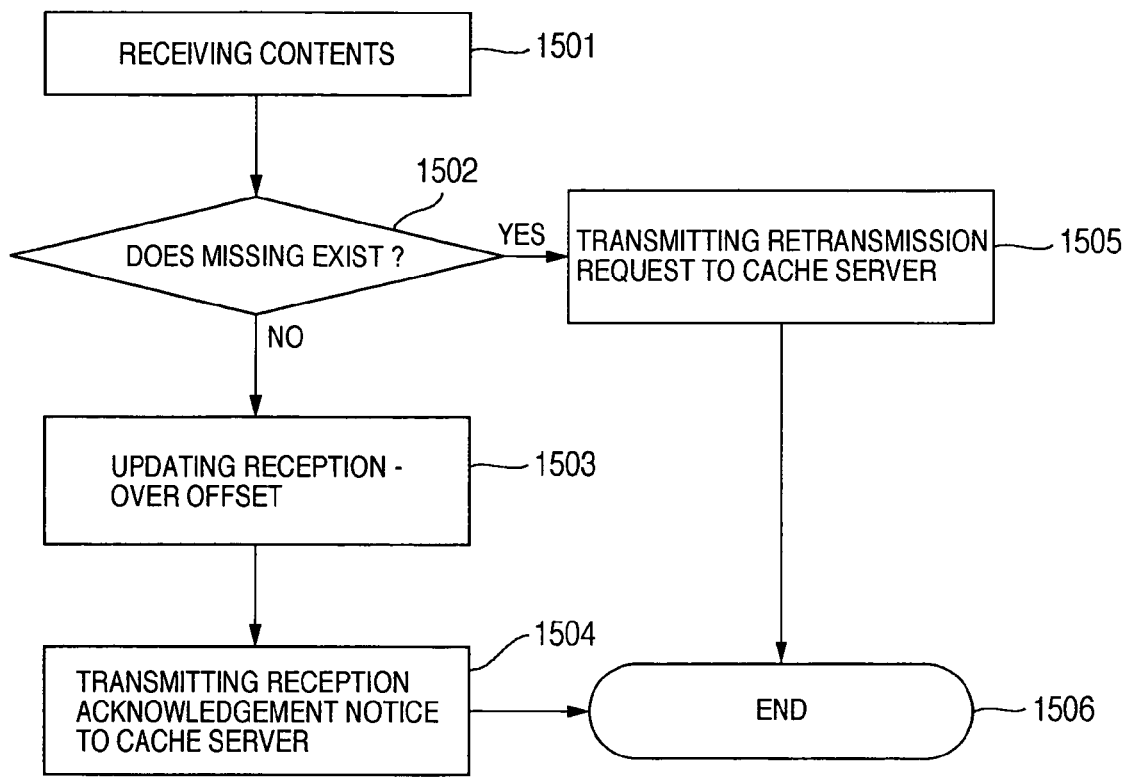
FIG. 15 is a flowchart for exemplifying the operation at the time when the mobile node receives the contents.

Referring to FIG. 13 to FIG. 15, the explanation will be given below concerning the operation of the mobile node (103).

Taking advantage of a reception-contents management table (1301), the mobile node (103) manages which of the contents (109) is being received at present. Moreover, the mobile node (103) starts the operation with detection of the moving from the wireless LAN and reception of the contents as the opportunities. Hereinafter, the indication will be given below regarding data structure of the reception-contents management table (1301), and operation steps of the mobile node (103) in the above-described respective operation opportunities.

FIG. 13 is a diagram for illustrating the data structure of the reception-contents management table (1301) that the mobile node (103) holds.

The present table includes the following fields: Delivery-server IP address (IP address of the delivery server (101) which holds the contents whose delivery is requested), URL (information for uniquely identifying the contents whose delivery is requested), cache-server IP address (IP address of the cache server which is delivering the contents), and reception-over offset (offset for the contents whose reception the mobile node (103) has been completed).

FIG. 14 is a flowchart for illustrating the operation at the time when the mobile node (103) detects that the mobile node has moved from the cell (i.e., service area) of a wireless LAN to which the mobile node itself had belonged.

At a step 1401, the mobile node (103) detects the presence or absence of the moving from the wireless-LAN cell. The detection of the moving is made possible in the following way, for example: Namely, the mobile node receives information on the corresponding access point which is broadcasted on a periodic basis by each access-point device, thereby checking whether or not the IP address of a cache server which the mobile node itself is utilizing has changed.

If the mobile node has detected the moving, at a step 1402, the mobile node transmits the moving notice (107) to the new cache server (102-2) which is the moving destination.

At a step 1403, the mobile node updates the cache-server IP address in the reception-contents management table (1301). The value of the new cache-server IP address field is set to the value of the cache-server IP address included in the broadcasted signal received at the step 1401. In addition, the cache server terminates the processing.

FIG. 15 is a flowchart for illustrating the operation at the time when the mobile node (103) receives the contents.

At a step 1501, the mobile node (103) receives the contents from the cache server (102).

At a step 1502, the mobile node makes the comparison between a correspondence offset of the received contents and the reception-over offset in the reception-contents management table (1301). If the correspondence offset of the received contents is found to be larger, the mobile node judges that a data missing has occurred, and thus the node jumps to a step 1505. Otherwise, the node jumps to a step 1503.

At the step 1503, the mobile node updates the value of the reception-over offset field in the reception-contents management table (1301) to the correspondence offset of the received contents.

At a step 1504, the mobile node transmits the reception acknowledgement notice to the cache server (102) which is the contents transmission-source, thereby terminating the processing.

At the step 1505, the mobile node transmits a retransmission request whose content is the same as the delivery request (106) to the cache server (102) which is the contents transmission-source, thereby terminating the processing.

The specification and drawings are, accordingly, to be regarded in an illustrative rather than a restrictive sense. It will, however, be evident that various modifications and changes may be made thereto without departing from the spirit and scope of the invention as set forth in the claims.

The invention claimed is:

1. A cache server for assisting contents delivery from a delivery server to a mobile node, wherein the cache server is configured to perform the steps of:

receiving a moving notice from the mobile node, the moving notice notifying a change of cache server which the mobile node utilizes from a previous cache server to the cache server, wherein the moving notice includes URL uniquely identifies a requested content;

transmitting a request to the previous cache server, the request being needed for processing a retransmission request which the mobile node has a possibility of making, wherein the previous cache server is identified from information included in the moving notice and having been utilized before the moving by the mobile node;

receiving information from the previous cache server, wherein the information is needed for processing the retransmission request;

identifying the requested content identified by the URL in the moving notice, wherein the content has been requested by the mobile node;

judging whether or not the cache server itself has already held the content identified by the URL;

if the cache server itself has held the content, transmitting a deletion request to the previous cache server as the request needed for processing the retransmission request, wherein the deletion request is intended for deleting the content which the previous cache server has held; and as a response to the deletion request, receiving from the previous cache server information on a portion which the mobile node has received, and information on a portion which the mobile node has transmitted;

wherein the data delivered to the mobile node is stream-delivery data and the transmission timing of which is determined on each frame basis, and the cache server is further configured to perform a step of:

receiving, from the previous cache server, the stream-delivery data which the previous cache server has held with a higher-speed timing which differs from the transmission timing determined for the delivery of the stream-delivery data.

2. The cache saver according to claim 1, further executing the steps of:

judging whether or not the cache server itself has already held the requested content;

if the cache server itself has not held the requested content, transmitting a moving request to the previous cache server as the request needed for processing the retransmission request, wherein the moving request is intended for moving information which the previous cache server has held; and as response to the request needed for processing the retransmission request, receiving, from the previous cache server information on a portion which the mobile node has already received, information on a portion which the mobile node has transmitted, and a portion of the content includes at least a portion which the mobile node has not received yet.

3. The cache server according to claim 1, further executing the steps of:

receiving a delivery request from the mobile node, wherein the delivery request is intended for delivering the data which the delivery server has held; and judging whether or not the cache server itself has held the requested data, and, if the cache server itself has not held the data, transmitting the data delivery request to the delivery server, and, if the cache server itself has held the data, transmitting the data to the mobile node.

4. A communications method of performing contents delivery by using a plurality of cache servers including at least a first cache server and a second cache server, the contents delivery being performed to a mobile node by a delivery server, the communications method comprising the steps of:

detecting a change of cache server which the mobile node utilizes from the first cache server to the second cache server;

transmitting a moving notice to the second cache server;

at the second cache server, receiving the moving notice from the mobile node;

from the second cache server, transmitting a request to the first cache server, the request being needed for processing a retransmission request which the mobile node has a possibility of making, the first cache server being identified from information included in the moving notice and having been utilized before the moving by the mobile node; and from the first cache server, transmitting information to the second cache server, the information being needed for processing the retransmission request;

wherein data delivered to the mobile node is stream-delivery data, the transmission timing of which is determined on each frame basis, and the first cache server, when transmitting the stream-delivery data which the first cache server has held to the second cache server, transmits the stream-delivery data with a higher-speed timing which differs from the transmission timing determined for the delivery of the stream-delivery data.

5. The communications method according to claim 4, wherein:

the moving notice includes URL identifying uniquely the content requested, and the method further comprises the steps of:

at the second cache server, identifying the requested content identified by the URL in the moving notice, wherein the content has been requested by the mobile node;

at the second cache server, judging whether or not the second cache server itself has already held the content identified by the URL, and, if the server itself has held the content, transmitting a deletion request to the first cache server as the request needed for processing the retransmission request, the deletion request being intended for deleting the content which the first cache server has held; and the first cache server, as response to the deletion request, transmitting information on a portion which the mobile node has received, and information on a portion which the mobile node has transmitted.

6. The communications method according to claim 4, further comprising the steps of:

at the second cache server, judging whether or not the second cache server itself has already held the content, and, if the server itself has not held the content, transmitting a moving request from the second cache server to the first cache server as the request needed for processing the retransmission request, the moving request being intended for moving information which the first cache server has held; and at the first cache server transmitting, as response to the request needed for processing the retransmission request, information on a portion which the mobile node has already received, information on a portion which the mobile node has transmitted, and a portion of the content which includes at least a portion which the mobile node has not received yet.

7. The communications method according to claim 4, further comprising a step of:

at the first cache server, deleting the content which the first cache server has held after the first cache server has transmitted the information needed for processing the requested retransmission request.

8. The communications method according to claim 4, further comprising the steps of:

at the first or second cache server, receiving a delivery request from the mobile node, wherein the delivery request is intended for delivering the data which the delivery server has held; and at the cache server, which has received the delivery request, judging whether or not the cache server itself has held the data, and, if the cache server itself has not held the data, transmitting the data delivery request to the delivery server, and, if the cache server itself has held the data, transmitting the data to the mobile node.

* * * * *